Inventors:
Roy Cross
Walter B. Phillips
Walter M. Cross Jr.

Patented Dec. 12, 1944

2,364,621

UNITED STATES PATENT OFFICE 2,364,621

WATER SEALING SHEET

Roy Cross, Walter B. Phillips, and Walter M. Cross, Jr., Kansas City, Mo., assignors to Kansas City Testing Laboratory, Kansas City, Mo., a corporation of Missouri Application May 2, 1941, Serial No. 391,563

4 Claims. (Cl. 117—65)

This invention relates to means of sealing water seepages and more particularly to accomplishing water sealing on surfaces by a particular method of arranging clays, having sealing characteristics, on surfaces. It more specifically relates to a water sealing membrane or layer of gelatinizing clay of the nature of bentonite or Florida-Georgia type clay held in position by an imbedded fabric mesh.

Bentonite and Florida-Georgia type plastic clays are known for their characteristics of swelling in water and preventing water penetration through films of the material. The most extensive use of these clays for water sealing purposes is in the drilling of oil wells wherein the clay is incorporated as a component of a drilling fluid and during the course of drilling forms a sealing wall on the drill hole. This prevents escape of water into the formations being drilled. Bentonite has also been used in loose form for sealing dams, ditches, and the like, but there is great difficulty in the practical application of the material, particularly when water is present. To effectively seal, it is necessary that the bentonite be placed at the point of seepage. In the building of roads it is highly desirable to stabilize the soil beneath the road to prevent seepage of water into the prepared surface where freezing, thawing, and the like cooperate to crack the prepared surface. Waterproofing foundations and roofs for building structures has always been a problem. Waterproofing of irrigation ditches at reasonable cost is a very serious problem in many localities. This invention has for its objects the accomplishment of waterproofing in the instances cited above and in others of like type.

In the drawing, Figure 1 is a drawing of a means of providing a clay coating to a surface desired to be waterproofed. The view is in perspective. In Figure 1, 1 is a mesh material made of any suitable product. 2 is a layer of plastic clay pressed onto the mesh material and bound thereto. 3 are transverse wedge-shaped slots in the layer of plastic clay. 4 are wedge-shaped longitudinal slots in the layer of plastic clay.

Figure 1:
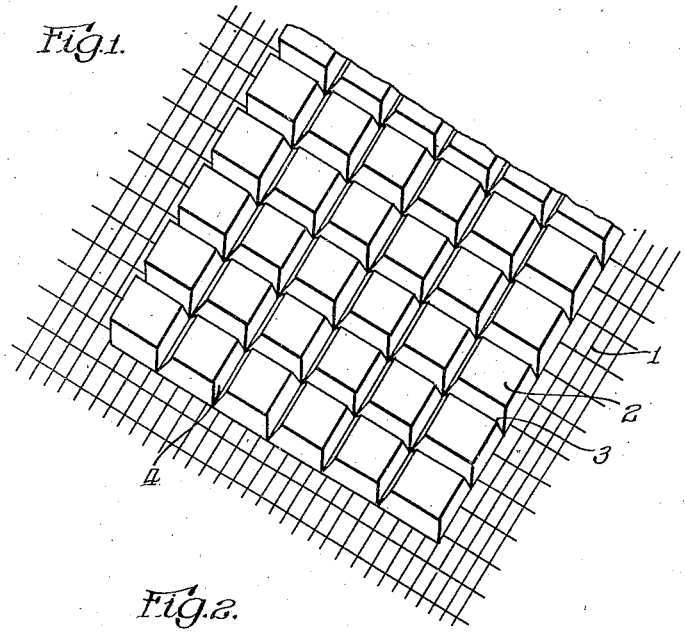
Figure 2:
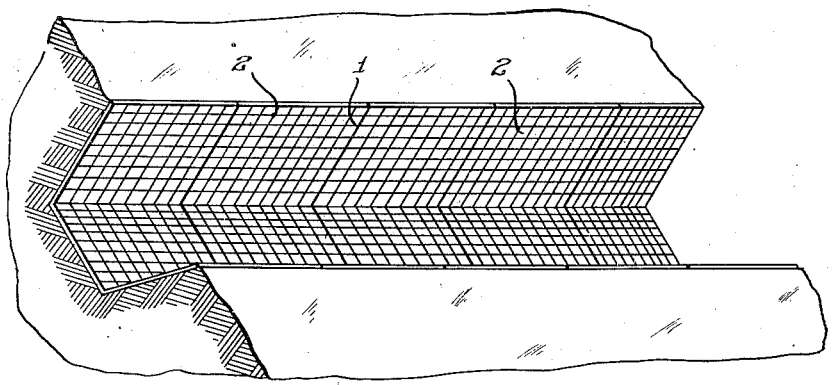
Figure 2 shows the method of waterproofing an irrigation ditch by the present invention. 1 is a section of a typical irrigation ditch in perspective view. 2 are sheets of clay mounted on mesh, as shown in Figure 1.
Figure 3:
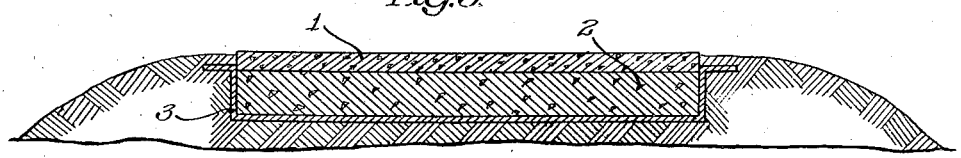
Figure 3 shows the application of the clay sheet to a road stabilization method. The view is cross-sectional, laterally across a road. 1 is a road surface. 2 is a road sub-surface or foundation. 3 is a sheet of clay applied to mesh, as shown in Figure 1.

A preferred form of the means of applying the method to waterproofing is as follows. Mesh is cut into rolls of convenient dimensions; for example, 3 feet wide by 20 feet long. Separately, a plastic clay of the proper type is supplied with just sufficient moisture to give it good binding characteristics. The amount of moisture varies for different types of clay. For example, bentonite of a size such as is retained on a 20 mesh screen and passed on a 10 mesh screen, is supplied with between 27% and 30% moisture. The water is applied as a spray and the material is thoroughly mixed. The net is laid in place and clay applied to it in the proper thickness, which, when compressed, will yield a sheet of approximately between 1/8" and 1/4" thickness. Pressure of 100 pounds per square inch, for example, is applied to the clay, embedding the mesh in it. Upon drying, a fairly dense sheet of the clay is in strip form. V grooves have been left in the clay at the time of compression in order to control the shape of the dried clay after shrinking and to provide means of rolling the strip of sheet clay. The grooves are arranged so that the sheet may be rolled to a desirable diameter. Furthermore, the wedge-shaped grooves in both directions provide for applying the sheet to uneven or curved surfaces. Grooves of any shape may be used and the mesh may be in the center of the sheet.

It has been found that when strips of such clay cover a surface to be waterproofed the water coming in contact with the clay swells it and provides a substantially filter-proof seal. The clays used in making the strips should have fairly high colloidal content. For example, bentonite will swell to 20 times its volume in water. Florida-Georgia type clay swells to a somewhat lesser degree and other clays such as are found in south Texas, southern Illinois, California, and in small deposits distributed in many places throughout the United States, have colloidal values which will vary from 20% to 90% of that of bentonite. It is the colloidal content of the clay that gives it its gelling characteristic when brought into contact with water. The gel formed makes a seal on the surface of the clay, thus preventing the penetration of water and forming a filter cake. A good filter cake will pass very little water per minute, even under several hundred pounds' pressure. While highly colloidal clays are desirable, economical considerations often make the use of less colloidal clays practical. It is sometimes desirable to mix a small percentage of hair or fibre to the clay before compressing to provide additional strength.

Any convenient means may be used to make this article used in the method of waterproofing herein disclosed. Usually, a system of rolls so designed as to provide lateral grooves ¾" to 1" apart and longitudinal grooves 3" to 6" apart, is used to compress the clay and bind it to the netting.

While bentonite and Florida-Georgia type clays have been mentioned herein and are clays having the best plastic and water sealing values, other clays may be used.

Having described the invention, what is claimed is:

1. A prefabricated water sealing sheet comprising a flexible open mesh material and a continuous layer of a cohesive gel forming clay compressed in the interstices and on the surface of said mesh material, said sealing sheet having a thickness within the range from approximately ⅛ inch to ¼ inch.

2. A prefabricated sheet as claimed in claim 1 in which the gel forming clay is a colloidal clay of the Florida-Georgia type.

3. A prefabricated substantially flexible water sealing sheet comprising a flexible open mesh material and a continuous layer of substantial thickness comprising a cohesive gel-forming clay compressed in the interstices and on the surface of said mesh material, said sealing sheet having an average thickness in excess of approximately ⅛ inch.

4. A prefabricated substantially flexible water sealing sheet comprising a flexible open mesh material and a continuous layer of bentonite of substantial thickness compressed in the interstices and on the surface of said mesh material, said sealing sheet having an average thickness in excess of approximately ⅛ inch.

ROY CROSS.
WALTER B. PHILLIPS.
WALTER M. CROSS, Jr.